United States Patent
Kosterev

(10) Patent No.: US 11,686,670 B2
(45) Date of Patent: Jun. 27, 2023

(54) ISOLATION OF FLUID SAMPLE IN MULTI-PASS OPTICAL SYSTEM

(71) Applicant: Yokogawa Electric Corporation, Tokyo (JP)

(72) Inventor: Anatoliy A. Kosterev, Sugar Land, TX (US)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 240 days.

(21) Appl. No.: 17/088,150

(22) Filed: Nov. 3, 2020

(65) Prior Publication Data
US 2022/0136962 A1 May 5, 2022

(51) Int. Cl.
*G01N 21/31* (2006.01)
*G02B 17/00* (2006.01)
(Continued)

(52) U.S. Cl.
CPC .............. *G01N 21/31* (2013.01); *G02B 1/11* (2013.01); *G02B 17/004* (2013.01);
(Continued)

(58) Field of Classification Search
CPC ......... G01N 21/31; G01N 2201/06113; G01N 2201/068; G02B 1/11; G02B 17/004; G02B 27/0006; G02B 27/62
See application file for complete search history.

(56) References Cited

U.S. PATENT DOCUMENTS 5,949,537 A * 9/1999 Inman .................... G01N 21/15
356/246
7,307,716 B2 12/2007 Silver
(Continued)

FOREIGN PATENT DOCUMENTS

CN 113204126 B * 8/2022 ............ G01M 11/02
JP S6423142 1/1989
(Continued)

OTHER PUBLICATIONS

Borysow et al., "Laser multipass system with interior cell configuration" Applied Optics. vol. 50, 30. 2011 Optical Society of America.
(Continued)

*Primary Examiner* — Mohamed K Amara
(74) *Attorney, Agent, or Firm* — Gray Ice Higdon

(57) ABSTRACT

Implementations are described herein for isolating mirrors and/or other potentially-vulnerable components of multi-pass optical systems from samples being analyzed, while mitigating interference and/or reduction in optical power. In one implementation, an apparatus may include: an optical cell with one or more passages, the one or more passages provided for introducing a sample into an interior of the optical cell for analysis and for removing the sample from the interior; a first mirror with a first reflective surface that faces the interior of the optical cell; one or more additional mirrors with one or more corresponding additional reflective surfaces that face the first reflective surface of the first mirror; and a wedge-shaped optical element positioned between the first mirror and the interior of the optical cell.

17 Claims, 3 Drawing Sheets

(51) Int. Cl.
*G02B 27/00* (2006.01)
*G02B 1/11* (2015.01)

(52) U.S. Cl.
CPC ... *G02B 27/0006* (2013.01); *G01N 2201/068* (2013.01); *G01N 2201/06113* (2013.01)

(56) References Cited

U.S. PATENT DOCUMENTS

| | | | |
|---|---|---|---|
| 7,477,377 B2 | 1/2009 | Silver | |
| 8,218,139 B2 | 7/2012 | Milosevic et al. | |
| 9,234,794 B2 | 1/2016 | Bond et al. | |
| 9,250,175 B1* | 2/2016 | McManus | G01J 3/021 |
| 10,222,595 B2 | 3/2019 | Paul | |
| 10,634,558 B1* | 4/2020 | Scott | G01J 3/26 |
| 2002/0105997 A1* | 8/2002 | Zhang | H01S 3/0941 |
| | | | 372/34 |
| 2002/0122094 A1* | 9/2002 | Haflinger | G06K 15/102 |
| | | | 347/41 |
| 2003/0227956 A1* | 12/2003 | Scaggs | H01S 3/225 |
| | | | 372/57 |
| 2004/0263861 A1* | 12/2004 | Rafac | G01J 3/0205 |
| | | | 356/519 |
| 2006/0011844 A1* | 1/2006 | Oka | G01N 21/3504 |
| | | | 250/343 |
| 2006/0232772 A1* | 10/2006 | Silver | G01N 21/05 |
| | | | 356/246 |
| 2007/0242720 A1* | 10/2007 | Eckles | G01N 33/0047 |
| | | | 372/107 |
| 2008/0165337 A1* | 7/2008 | Ershov | G03F 7/70625 |
| | | | 430/322 |
| 2008/0204718 A1* | 8/2008 | Trainer | G01N 21/53 |
| | | | 356/73 |
| 2009/0185190 A1* | 7/2009 | Weinberger | B01L 7/00 |
| | | | 356/450 |
| 2010/0238446 A1* | 9/2010 | Akiyama | G01N 21/05 |
| | | | 356/246 |
| 2012/0287418 A1* | 11/2012 | Scherer | G01N 33/004 |
| | | | 356/51 |
| 2012/0294321 A1* | 11/2012 | Ma | B82Y 20/00 |
| | | | 372/20 |
| 2012/0314722 A1* | 12/2012 | Heller | H01S 3/305 |
| | | | 372/3 |
| 2013/0044323 A1* | 2/2013 | Liu | G01N 21/39 |
| | | | 356/437 |
| 2015/0185907 A1* | 7/2015 | Yashiro | G02B 1/14 |
| | | | 345/174 |
| 2016/0069795 A1* | 3/2016 | Koulikov | H01S 3/0071 |
| | | | 359/857 |
| 2016/0084757 A1* | 3/2016 | Miron | G01N 21/031 |
| | | | 356/437 |
| 2017/0038509 A1* | 2/2017 | Iwamoto | G02B 27/28 |
| 2017/0139191 A1* | 5/2017 | Paul | G01N 21/031 |
| 2017/0168275 A1* | 6/2017 | Akamatsu | G02B 17/0636 |

FOREIGN PATENT DOCUMENTS

| | | |
|---|---|---|
| JP | H0835926 | 2/1996 |
| JP | 2006084342 | 3/2006 |
| JP | 2007248388 | 9/2007 |
| JP | 2016033484 | 3/2016 |
| WO | WO-0077893 A2 * | 12/2000 ........... H01S 3/0941 |

OTHER PUBLICATIONS

White, "Long Optical Paths of Large Aperture" Esso Laboratories, Standard Development Company, Linden, New Jersey. vol. 32. pp. 285-288. May 1942.
Japanese Patent Office; Office Action issued for Application No. 2021-179428, 6 pages, dated Oct. 4, 2022.
Herbst et al., "Compact Multi Reflection Cells for Optical Gas Sensor Applications" Sensor+Test Conference 2009—IRS Proceedings, pp. 255-256.
Herriott et al., "Off-Axis in Spherical Mirror Interferometers" Applied Optics 3, No. 4, pp. 523-526, dated dated Apr. 1964.
Herriott et al., "Folded Optical Delay Lines" Applied Optics 4, No. 8, 883-889, dated 1965.
Japanese Patent Office; Notice of Allowance issued for Application No. 2021-179428, 3 pages, dated Jan. 17, 2023.

* cited by examiner

ISOLATION OF FLUID SAMPLE IN MULTI-PASS OPTICAL SYSTEM

BACKGROUND

Chemical fluid analysis may be performed using various types of optical absorption spectroscopy, including laser absorption spectroscopy. The sensitivity of these techniques is improved by using multi-pass optical cells. In a multi-pass optical cell, an optical path length of light emitted by a light source such as a laser is increased by reflecting the light through the analyzed sample (e.g., gas) multiple times using mirrors. Multi-pass cells come in numerous configurations, such as a White cell, a Herriott cell, a Chernin cell, and a Robert cell, to name a few.

In existing multi-pass optical cells, mirror(s) are directly exposed to the sample-to-be-analyzed for a variety of reasons. However, directly exposing components—such as mirrors and/or optomechanical components that are operable to adjust poses of the mirrors—to the sample-to-be-analyzed may present various challenges. Many samples may be corrosive and/or may have extreme temperatures that can damage high-reflectivity mirrors. Additionally, particulate matter contained in many samples may be deposited onto and/or scratch these mirrors.

Positioning conventional protective layers such as optical windows between mirrors/components and the sample may deflect and/or distort the light beams, and/or may introduce optical losses that reduce the available optical power during the multiple passes. In addition, the optical radiation reflected from additional surfaces inside a multi-pass cell may interfere with other beams in a phenomenon called "interference fringes"—a primary limiter of laser absorption spectroscopy sensitivity, for instance.

SUMMARY

Implementations are described herein for isolating mirrors and/or other optomechanical components of multi-pass optical systems from samples being analyzed, while mitigating interference and/or reduction in optical power. In various implementations, an optical cell may be provided with one or more optical elements, such as optical windows. In some cases, two optical elements may be employed at opposite ends of the optical cell from each other. The optical elements may be constructed with a material such as glass or a clear polymer that permits passage of light, and in some cases may be wholly or partially coated with an anti-reflective material.

As alluded to previously, if planar optical elements were deployed at right angles to hermetically seal the optical cells, they may introduce multiple undesired reflected beams propagating in the same direction as the primary beams. Overlap of such unintended reflections with primary beams is a known source of the baseline modulation (interference fringes) that limits the sensitivity of the absorption spectroscopy. To avoid such unwanted effects, in some implementations, the optical elements (sometimes referred to herein as "windows") sealing the optical cell may be wedge-shaped and additionally angled to an optical axis of the system. Each of the wedge-shaped, tilted optical elements will introduce a shift and angular deviation to the incident beams. However, the proper orientation of two such elements results in almost complete cancellation of optical shift and deviation. The cancellation is most efficient for planar propagation of all the beams. Therefore, the White cell configuration featuring near-planar optical geometry may be favored in some implementations over other configurations, such as a Herriott cell.

A light source may be provided to emit light that passes through one of the wedge-shaped optical elements, through the interior of the optical cell, and towards one of potentially multiple mirrors—sometimes referred to as "objective" mirrors—on an opposite side of the optical cell. The light source may take various forms and may emit various types of light, or more generally, electromagnetic radiation, which may or may not be visible to the human eye. In some cases, the light source may emit coherent light and may take the form of a laser. In other cases, the light source emits incoherent light. The incoherent light may be coupled to the multi-pass optical cell using one or more optical elements, such as lenses and/or mirrors. Whichever the case, this coherent or focused light beam may be reflected from the objective mirror towards another mirror—sometimes referred to as a "field" mirror—which in turn may reflect the light back towards another objective mirror. This may be repeated multiple times, with each repeat extending the overall optical path and, hence, the accuracy of the multi-pass optical system.

A light detector such as a photodiode may also be deployed to detect light as it exits the optical cell. This detected light may be analyzed to determine a variety of different characteristics of the sample, such as its reactance to various wavelengths of light, density and/or other attribute(s) of particular matter contained in the sample, etc. The detected light may be reflected from a mirror of the multi-pass optical system. For example, a photodiode placed proximate the field mirror may capture light reflected from one of the objective mirrors through the optical cell (including through the opposing wedge-shaped optical elements).

The light beams and mirrors described herein may be intolerant to even slight deviations from precise alignment. For example, light beams reflected from objective mirrors may need to reach the field mirror at precise points; otherwise light beams may not be reflected from the field mirror in the correct directions. Accordingly, in another aspect, implementations are described herein relating to a stencil that includes a plurality of apertures for aligning light beams reflected from objective mirrors to desired points on a field mirror. A stencil configured with selected aspects of the present disclosure may be shaped and/or sized so that it can be precisely fitted into complementary structure associated with a multi-pass optical system. For example, the multiple pass optical system may include an alignment rail or recess, and the stencil may include an extension or protrusion that is sized and shaped to fit into the alignment rail/recess. Once so aligned, apertures of the stencil may be aligned with locations on the field mirror at which light reflected from objective mirrors is supposed to strike.

In various implementations, a multi-pass optical system may include: a hermetically-sealed optical cell to receive a fluid sample for multi-pass optical analysis; two opposing wedged-shaped optical elements disposed on opposite ends of the optical cell; a field mirror with a first concave reflective surface that faces the interior of the optical cell; a plurality of objective mirrors, each with a respective concave reflective surface that faces the first concave reflective surface of the field mirror; a light source to emit light through the optical cell towards the concave reflective surface of one of the plurality of objective mirrors; and a light detector to detect light reflected from the concave reflective surface of another of the plurality of objective mirrors.

In various implementations, the two opposing wedge-shaped optical elements may be arranged at non-parallel angles relative to the field mirror and the plurality of objective mirrors. In various implementations, the angles may be between 0° and 4°, such as between 1 and 3. In various implementations, each of the wedge-shaped optical elements may be tapered at an angle between 0° and 4°, such as in the range of 0.5° to 3°.

In various implementations, each of the two opposing wedge-shaped optical elements is tapered from a thicker end to a thinner end. The thicker end of one of the opposing wedge-shaped optical element may be aligned across the optical cell with the thinner end of the other of the opposing wedge-shaped optical elements.

In another aspect, an apparatus may include: an optical cell with one or more passages, the one or more passages provided for introducing a sample into an interior of the optical cell for analysis and for removing the sample from the interior; a first mirror with a first reflective surface that faces the interior of the optical cell; one or more additional mirrors with one or more corresponding additional reflective surfaces that face the first reflective surface of the first mirror; and a wedge-shaped optical element positioned between the first mirror and the interior of the optical cell.

In various implementations, the wedge-shaped optical element may hermetically seal the interior of the optical cell at one end. In various implementations, the wedge-shaped optical element is at least partially coated with an anti-reflective material. In various implementations, the wedge-shaped optical element may be arranged at a non-parallel angle relative to the first mirror. In various implementations, the angle is between 0° and 4°, such as in the range of 1° to 3°. In various implementations, the wedge-shaped optical element is tapered at an angle between 0° and 4°, such as in the range of 0.5° to 3°.

In various implementations, the wedge-shaped optical element may be a first wedge-shaped optical element, and the apparatus may further include a second wedge-shaped optical element positioned between the one or more additional mirrors and the interior of the optical cell. In various implementations, the second wedge-shaped optical element may be arranged at a non-parallel angle relative to the one or more additional mirrors. In various implementations, the angle may be a first angle, the first wedge-shaped optical element may be arranged at a second angle relative to the first mirror, and the first and second angles may be substantially congruent.

In various implementations, the second wedge-shaped optical element may hermetically seal the interior of the optical cell at one end. In various implementations, each of the first and second wedge-shaped optical elements may be tapered from a thicker end to a thinner end. The thicker end of the first wedge-shaped optical element may be aligned across the optical cell with the thinner end of the second wedge-shaped optical element. The thinner end of the first wedge-shaped optical element may be aligned across the optical cell with the thicker end of the second wedge-shaped optical element.

In yet another aspect, a method may include: energizing a light source to emit a beam of light through a first wedge-shaped optical element, into an interior of an optical cell that contains a fluid sample, and through an opposing second wedge-shaped optical element towards a first mirror on an opposite side of the optical cell from the first wedge-shaped optical element; detecting, at a photodiode, a reflected beam of light that is reflected from a second mirror on the opposite side of the optical cell from the first wedge-shaped element, wherein the reflected beam of light passes through the second wedge-shaped optical element, the interior of the optical cell, and the first wedge-shaped optical element; and analyzing the reflected beam of light to ascertain a characteristic of the fluid sample.

In various implementations, the method may further include calibrating a third mirror using a stencil that includes a plurality of apertures. In various implementations, the first and second mirrors are objective mirrors and the third mirror is a field mirror. In various implementations, the calibrating may include aligning the plurality of apertures with points on the field mirror that are reached by beams of light reflected the objective mirrors.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
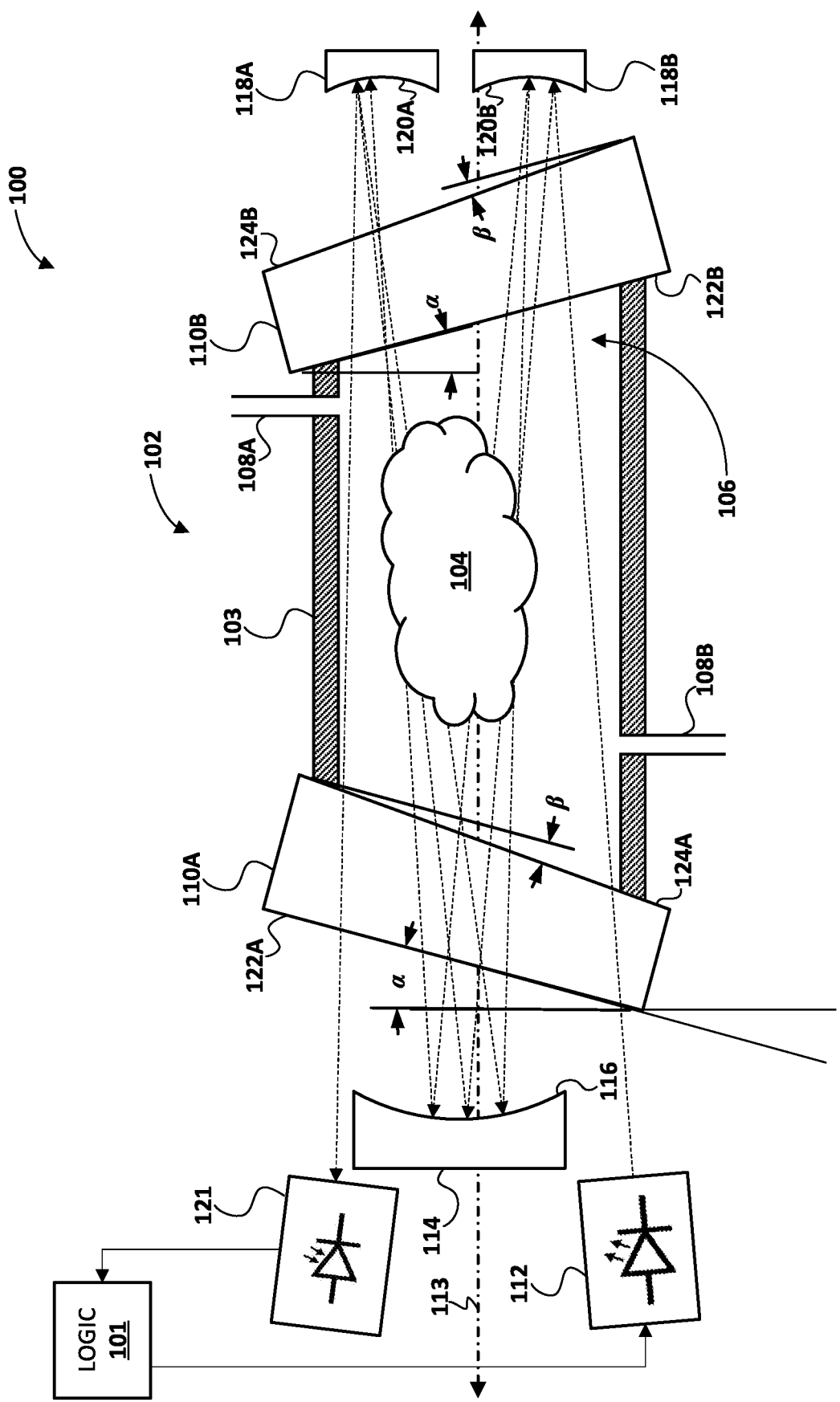
FIG. 1 schematically depicts an example multi-pass optical system in which selected aspects of the present disclosure may be employed in accordance with various implementations.

FIG. 1 schematically depicts an example multi-pass optical system 100 in which selected aspects of the present disclosure may be employed in accordance with various implementations. The components depicted in FIG. 1 are not drawn to scale. Various component sizes and spatial relationships between various components (e.g., angles) are exaggerated for illustrative purposes.

Multi-pass optical system 100 includes an optical cell 102 that is configured to receive a fluid sample 104 for multi-pass optical analysis, and that includes one or more walls 103 that define an interior 106. One or more walls 103 may take various forms depending on a shape of optical cell 102. For example, in FIG. 1, optical cell 102 may have a cylindrical shape (shown in cross section of FIG. 1) and therefore there may be a single wall 103. In other implementations in which optical cell 102 has other shapes, there may be more than one wall 103.

As used herein, a "fluid sample" refers to any fluid, whether in liquid or gaseous form. In various implementations, optical cell 102 may be hermetically sealed, e.g., by one or more walls 103 and/or by other elements described herein, so that fluid sample 104 cannot escape interior 106 except at selected locations. For example, optical cell 102 may include one or more passages 108A, 108B through wall(s) 103 that are selected locations provided for introducing fluid sample 104 into interior 106 of optical cell 102 for analysis, and for removing (e.g., purging with inert gas such as nitrogen) fluid sample 104 from interior 106. In FIG. 1, first passage 108A is for introducing fluid sample 104 into interior 106 and second passage 108B is for removing fluid sample 104 from interior 106, but this is not meant to be limiting. Passages 108A, 108B may take various forms, such as valves that are operable to permit and/or prevent passage of fluid in/out of interior 106.

Multi-pass optical system 100 may also include one or more opposing wedged-shaped optical elements 110A, 110B disposed on opposite ends of optical cell 102. Each wedge-shaped optical element 110 may be tapered on one or both sides. In FIG. 1, both wedge-shaped optical elements 110A, 110B are tapered on one side at an angle of β, but this is not meant to be limiting. In various implementations, the angle β may have various magnitudes, such as between 0° and 4°. For example, the angle β can be from 1° to 3°, or 2° to 3°. In some implementations, wedge-shaped optical elements 110A, 110B hermetically seal interior 106 of optical cell 102 at one or both ends. In some implementations, wedge-shaped optical elements 110A, 110B may be at least partially coated with an anti-reflective material, such as a film having alternating layers of contrasting refractive index.

Logic 101 may be provided and operably coupled with a light source 112 and a light detector 121. Logic 101 may take various forms, such as one or more processors that execute instructions (transitory and/or non-transitory) stored in a memory (not depicted) to analyze fluid sample 104 in order to ascertain one or more characteristics of fluid sample 104. For example, light beam(s) reflected from within interior 106 of optical cell 102 may be analyzed by logic 101 using techniques such as optical absorption spectroscopy, including laser absorption spectroscopy. In some embodiments, logic 101 may include analog front-ends, such as a laser or LED driver for light source 112 and an amplifier for light detector 121. Logic 101 may take other forms in other implementations, such as an application-specific integrated circuit (ASIC) and/or a field-programmable gate array (FPGA).

Multi-pass optical system 100 may also include various arrangements of mirrors of various sizes and shapes. The mirrors may be positioned relative to each other in order to reflect light emitted by light source 112 multiple times within interior 106 of optical cell 102. Consequently, the optical path of light that is passed through fluid sample 104 to ascertain attribute(s) of fluid sample 104 is increased, thereby increasing sensitivity to optical absorption. Light source 112 may take various forms, such as the light-emitting diode (LED) depicted in FIG. 1. Light source 112 may emit coherent or incoherent light. In the former case, light source 112 may take the form of a laser source or an optical fiber that delivers laser light that is emitted from an external laser source. In each case, one or more additional optical elements, such as lenses and mirrors (not depicted), may be provided to couple the light emitted by light source 112 to the multipass configuration. The light detector 121 may include light-collecting optics such as one or more lenses and/or mirrors (not depicted).

In FIG. 1, optical cell 102 takes the form of a White cell. Accordingly, the mirrors of multi-pass optical system 100 include, at one end of optical cell 102, a field mirror 114 with a first concave reflective surface 116 that faces the interior of the optical cell. A plurality (e.g., two) of objective mirrors 118A, 118B are deployed at an opposite end of optical cell 102. Objective mirrors 118A, 118B may include respective concave reflective surfaces 120A, 120B that face first concave reflective surface 116 of field mirror 114. FIG. 1 is not meant to be limiting, and implementations described herein are not limited to White cell-style optical cells.

In some implementations, the radius of curvature of each of field mirror 114 and objective mirrors 118A, 118B, and also the distance between field mirror 114 and objective mirrors 118A, 118B, may be between 100 and 1,500 mm, such as 1,000 mm. In some implementations, field mirror 114 may have a diameter of between 0.5" and 2", such as 1.0". In some implementations, objective mirrors 118A, 118B may have diameters between 0.25" and 1.0", such as 0.5".

Light source 112 may be positioned and/or aimed so that when energized (e.g., by logic 101), it emits light through optical cell 102 towards a concave reflective surface 120B of objective mirror 118B. As shown by the dashed arrows, this light is repeatedly reflected back and forth between field mirror 114 and objective mirrors 118A, 118B. It is noted that the quantity of reflections illustrated in FIG. 1 is only provided as an example, and more or fewer reflections of the light can occur. Eventually, a light detector 121 may detect light reflected from concave reflective surface 120A of objective mirror 118A. Light detector 121 may be a photo-detector of various forms, such as a photodiode.

As noted previously, if planar optical elements were deployed at right angles at opposite sides of optical cell 102, they may introduce multiple undesired reflected beams propagating in the same direction as the primary beams emitted by light source 112. Accordingly, in various implementations, in addition to being wedge-shaped, wedge-shaped optical elements 110A, 110B may be tilted slightly relative to a longitudinal axis 113 of optical cell 102. For example, in FIG. 1, both wedge-shaped optical elements 110A, 110B are arranged at non-parallel and substantially congruent angles α relative to field mirror 114 (and relative to objective mirrors 118A, 118B). In some implementations, the angle α may be between 0.5° and 4°, such as 3°. And in some embodiments, the angle β may be between 0.5° and 3°, such as 1.5°.

Due to their tapered shapes, each of the wedge-shaped optical elements 110A and 110B is tapered from a thicker end 122A, 122B to a thinner end 124A, 124B. In various implementations, thicker end 122A of first wedge-shaped optical element 110A may be aligned across optical cell 102 with thinner end 124B of second wedge-shaped optical element 110B. Likewise, thinner end 124A of first wedge-shaped optical element 110A may be aligned across optical cell 102 with thicker end 122B of the second wedge-shaped optical element.

The orientation and/or tapering of wedge-shaped optical elements 110A, 110B relative to each other and to other components of multi-pass optical system 100 may ensure first-order compensation for the shift and/or deviation of light that would otherwise occur. In particular, wedge-shaped optical elements 110A, 110B, when oriented as shown in FIG. 1, introduce minimal perturbations to propagation of light emitted from light source 112.

As noted previously, fluid sample 104 can have properties such as temperature, particulate, acidity, etc. that would corrode or otherwise damage field mirror 114 and objective mirrors 118A, 118B, and/or other optomechanical components that may be operable to, for instance, make adjustments to field mirror 114 and/or objective mirrors 118A, 118B. Wedge-shaped optical elements 110A and 110B can be deployed to isolate field mirror 114 and/or objective mirrors 118A, 118B from interior 106 of optical cell 102, e.g., by hermetically sealing optical cell 102. Accordingly, wedge-shaped optical elements 110A, 110B may protect field mirror 114 and/or objective mirrors 118A, 118B from damage that would otherwise occur from exposure to fluid sample 104.

As noted previously, the components of multi-pass optical system 100 such as mirrors 114, 118A, 118B may be intolerant to even slight deviations from precise alignment.

For example, light beams reflected from objective mirrors may need to reach field mirror 114 at precise points; otherwise light beams may not be reflected from field mirror 114 appropriately (e.g., the reflected radiation may not return to the desired objective mirror 118, or the total number of passes may differ from what was intended). Accordingly, in another aspect, implementations are described herein relating to a stencil that includes a plurality of apertures for aligning light beams reflected from objective mirrors to desired points on a field mirror.

Figure 2A:
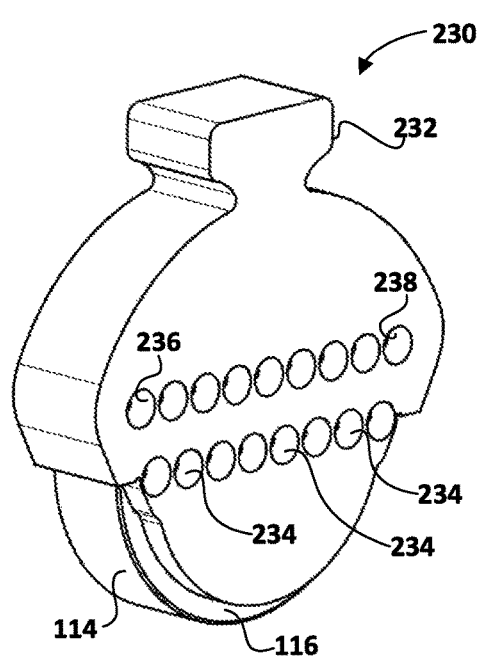
FIGS. 2A, 2B, 2C, and 2D depict an example stencil that may be used to align components of a multi-pass system, in accordance with various implementations.
Figure 2B:
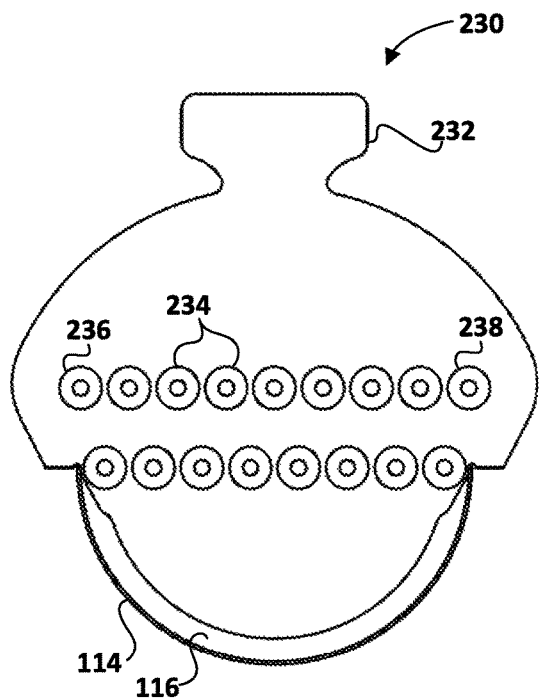
Figure 2C:
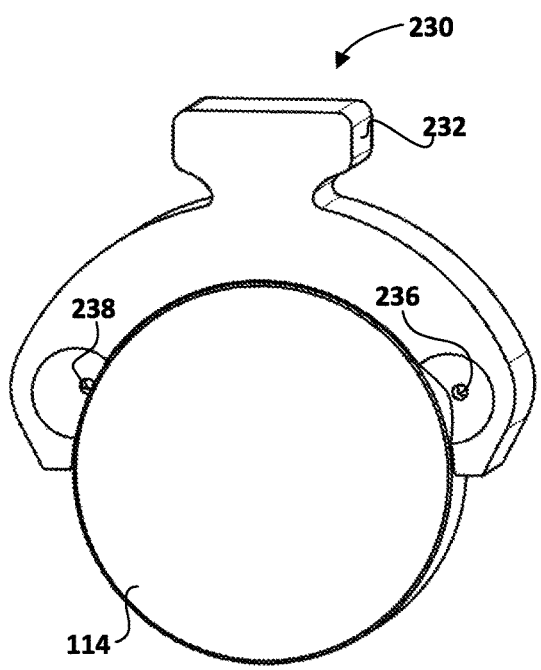

FIGS. 2A-2C depict views of an example stencil 230 from multiple perspectives. FIG. 2A is a perspective view of the front of stencil 230 and FIG. 2B is a front view. FIG. 2C is a perspective view of the back of stencil 230. Stencil 230 includes a protrusion 232 for convenient handling. The shape of stencil 230, particularly its sides, may be designed to mate with a mirror mount (not depicted) for strictly-defined positioning in front of field mirror 114 so that a plurality of apertures 234 (not all of which are labeled) of stencil 230 are aligned with suitable locations on concave reflective surface 116 of field mirror 114.

In some implementations, such as that depicted in FIGS. 2A-C, two additional "pass-through" apertures 236, 238 are not aligned with locations of field mirror 114. Instead, one of pass-through apertures 236 and 238 may be provided to enable light emitted by light source 112 to pass through, e.g., towards a reflective surface 120 of an objective mirror 118. The other of pass-through apertures 236 and 238 may be provided to enable light reflected from a reflective surface 120 of an objective mirror 118 to pass through to light detector 121.

Figure 2D:
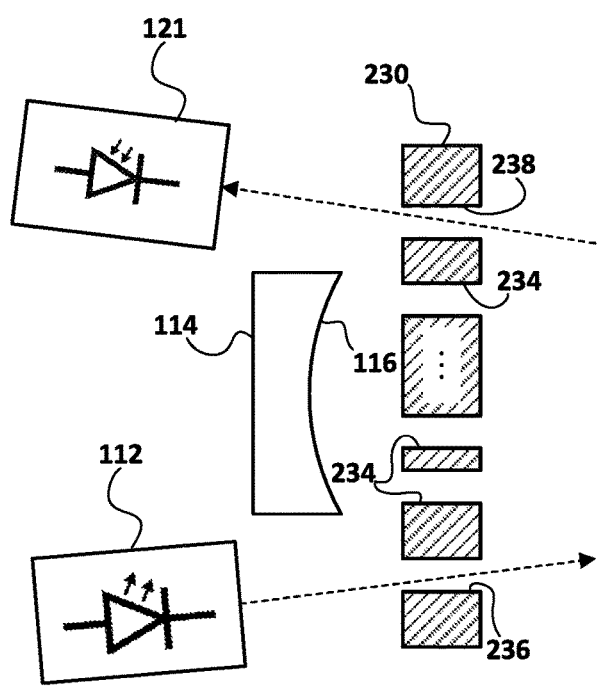

FIG. 2D schematically depicts, in cross section, one example of how stencil 230 may be used to align components of multi-pass optical system 100. Light emitted by light source 112 may first pass through aperture 236. While not shown in FIG. 2D, as shown in FIG. 1, that light beam may next pass through first wedge-shaped optical element 110A and interior 106 of optical cell 102. The light beam exits interior 106 of optical cell 102 through second wedge-shaped optical element 110B towards reflective surface 120B of objective mirror 118B on the opposite side of optical cell 102.

Next, the light beam is reflected some number of times between concave reflective surface 116 of field mirror 114 and concave reflective surfaces 120A, 120B of objective mirrors 118A, 118B. Eventually, the light beam may pass through aperture 238 towards light detector 121, as depicted in FIG. 2D. Thus, in order to ensure that field mirror 114, objective mirrors 118A, 118B, and/or other components of multi-pass optical system 100 are properly aligned, stencil 230 may be placed as shown in FIG. 2D to ensure that light detector 121 detects light that originates at light source 112. Stencil 230 itself may not be reflective. Consequently, if the reflected light beams within interior 106 of optical cell 102 are not aligned with apertures 234-238—as would occur if field mirror 114 and/or objective mirrors 118A, 118B were misaligned—little or no reflected light would reach light detector 121.

In various implementations of the White cell configuration, the number of times the light beam will be reflected between mirrors 114, 118A, 118B, and will pass through fluid sample 104, will be a multiple of four. In some implementations in which stencil 230 is used, the number of passes may be 4n, where n is the number of apertures 234 in the bottom row. FIGS. 2A-B depict eight apertures 234 in the bottom row. Accordingly, the light emitted by light source 112 passes through fluid sample thirty-two times. However, this is not meant to be limiting, and stencil 230 may be configured with other numbers of apertures 234 if more or less passes of light through fluid sample 104 are desired.

Figure 3:
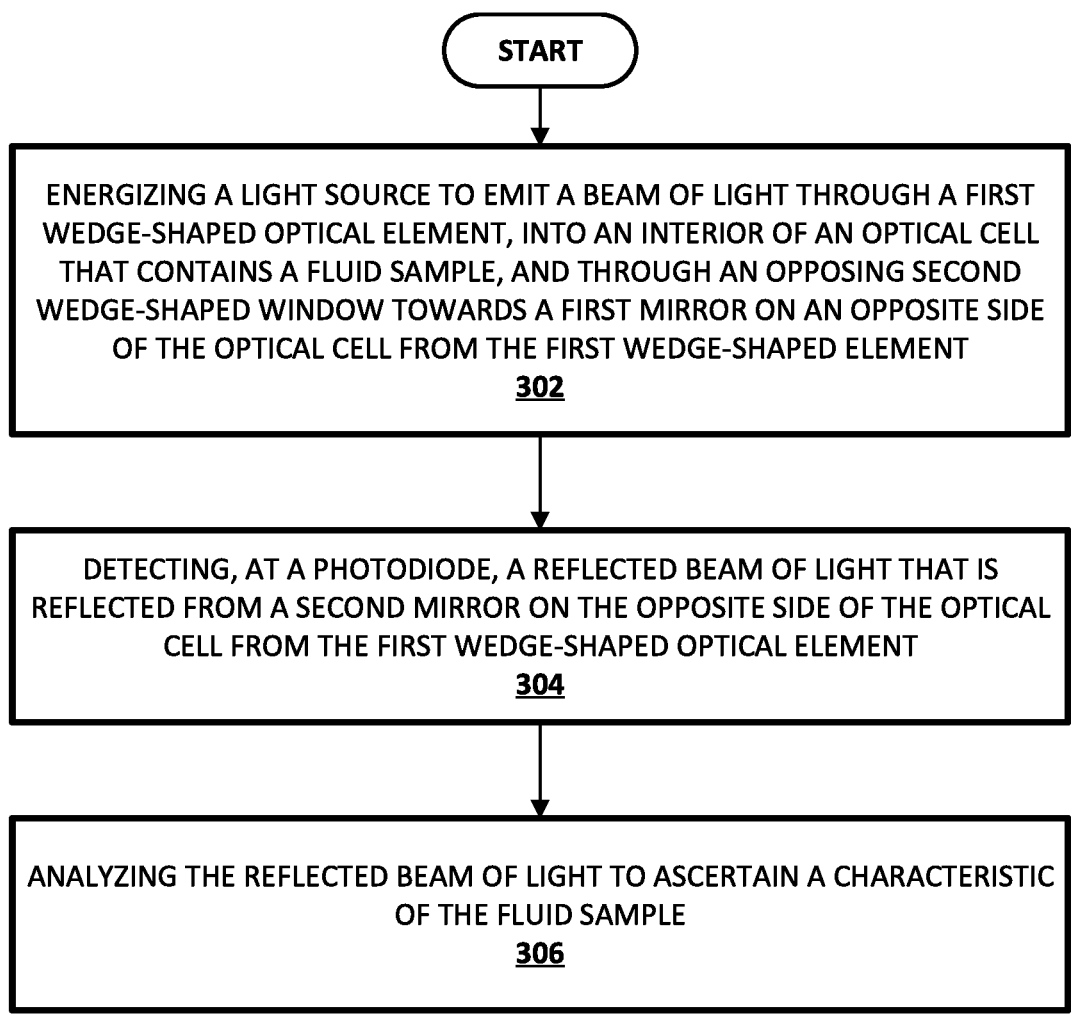
FIG. 3 is a flowchart of an example method in accordance with various implementations described herein.

FIG. 3 illustrates a flowchart of an example method 300 for practicing selected aspects of the present disclosure. Other implementations may include additional operations than those illustrated in FIG. 3, may perform step(s) of FIG. 3 in a different order and/or in parallel, and/or may omit one or more of the operations of FIG. 3.

At block 302, a light source such as light source 112 may be energized, e.g., by logic 101, to emit a beam of light through a first wedge-shaped optical element (e.g., 118A), into an interior (e.g., 106) of an optical cell (e.g., 102) that contains a fluid sample (e.g., 104), and through an opposing second wedge-shaped optical element (e.g., 118B) towards a first mirror (e.g., 118B) on an opposite side of the optical cell from the first wedge-shaped element. As noted previously, this light beam may be reflected between mirrors such as field mirror 114 on one side and objective mirrors 118A, 118B on the other, through fluid sample 104 some number (e.g., multiple of four) of times.

At block 304, a reflected beam of light may be detected at a photodiode (e.g., 121). The beam may have been reflected from a second mirror (e.g., 118A) on the opposite side of the optical cell from the first wedge-shaped optical element. In various implementations, on its way to the photodiode, the reflected beam of light may pass through the second wedge-shaped optical element (110B), the interior (106) of the optical cell (102), and the first wedge-shaped optical element (110A).

At block 306, the reflected beam of light may be analyzed to ascertain a characteristic of the fluid sample. For example, the reflected light beam may be analyzed, e.g., by logic 101, using techniques such as optical absorption spectroscopy, including laser absorption spectroscopy.

In some implementations, method 300 may further include calibrating a third mirror (e.g., field mirror 114) using a stencil (e.g., 230) that includes a plurality of apertures (e.g., 234), e.g., as depicted in FIG. 2D. In some such implementations, the calibrating may include aligning the plurality of apertures with points on the third mirror (e.g., 114) that are reached by beams of light reflected the first and second mirrors (e.g., 118A, 118B).

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A multi-pass optical system comprising:
a hermetically-sealed optical cell to receive a fluid sample for multi-pass optical analysis;
two opposing wedged-shaped optical elements disposed on opposite ends of a section of the optical cell where the multi-pass optical analysis is performed, wherein the two opposing wedge-shaped optical elements are oriented so that a thicker end of a first of the two opposing wedge-shaped optical element and a thinner end of a second of the two opposing wedge-shaped optical elements are closer to each other than a thinner end of the first of the two opposing wedge-shaped optical element and a thicker end of the second of the two opposing wedge-shaped optical elements;
a field mirror with a first concave reflective surface that faces the interior of the optical cell;
a plurality of objective mirrors, each with a respective concave reflective surface that faces the first concave reflective surface of the field mirror;
a light source to emit light through the optical cell towards the concave reflective surface of one of the plurality of objective mirrors; and
a light detector to detect light reflected from the concave reflective surface of another of the plurality of objective mirrors.

2. The multi-pass optical system of claim 1, wherein the two opposing wedge-shaped optical elements are arranged at non-parallel angles relative to a longitudinal axis of the optical cell.

3. The multi-pass optical system of claim 2, wherein the non-parallel angles are between 0° and 4°.

4. The multi-pass optical system of claim 1, wherein each of the two wedge-shaped optical elements is tapered at an angle between 0° and 4°.

5. An apparatus comprising:
an optical cell with one or more passages, the one or more passages provided for introducing a sample into an interior of the optical cell for analysis and for removing the sample from the interior;
a first mirror with a first reflective surface that faces the interior of the optical cell;
one or more additional mirrors with one or more corresponding additional reflective surfaces that face the first reflective surface of the first mirror;
a first wedge-shaped optical element positioned between the first mirror and the interior of the optical cell; and
a second wedge-shaped optical element positioned between the one or more additional mirrors and the interior of the optical cell,
wherein the first and second wedge-shaped optical elements are oriented so that a thicker end of the first wedge-shaped optical element and a thinner end of the second wedge-shaped optical elements are closer to each other than a thinner end of the first wedge-shaped optical element and a thicker end of the second wedge-shaped optical elements.

6. The apparatus of claim 5, wherein the first wedge-shaped optical element hermetically seals the interior of the optical cell at one end.

7. The apparatus of claim 5, wherein the first wedge-shaped optical element is arranged at a non-parallel angle relative to the first mirror.

8. The apparatus of claim 7, wherein the angle is between 0° and 4°.

9. The apparatus of claim 5, wherein the first and second wedge-shaped optical elements are tapered at an angle between 0° and 4°.

10. The apparatus of claim 5, wherein the second wedge-shaped optical element is arranged at a non-parallel angle relative to the one or more additional mirrors.

11. The apparatus of claim 10, wherein the angle is a first angle, the first wedge-shaped optical element is arranged at a second angle relative to the first mirror, and the first and second angles are substantially congruent.

12. The apparatus of claim 5, wherein the second wedge-shaped optical element hermetically seals the interior of the optical cell at one end.

13. The apparatus of claim 5, wherein the first or second wedge-shaped optical element is at least partially coated with an anti-reflective material.

14. A method comprising:
energizing a light source to emit a beam of light through a first wedge-shaped optical element, into an interior of an optical cell in which multi-pass optical analysis is performed on a fluid sample, and through an opposing second wedge-shaped optical element on an opposite side of the interior of the optical cell from the first wedge-shaped optical element, towards a first mirror on an opposite side of the optical cell from the first wedge-shaped element,
wherein the first and second wedge-shaped optical elements are oriented so that a thicker end of the first wedge-shaped optical element and a thinner end of the second wedge-shaped optical elements are closer to each other than a thinner end of the first wedge-shaped optical element and a thicker end of the second wedge-shaped optical elements;
detecting, at a photodiode, a reflected beam of light that is reflected from a second mirror on the opposite side of the optical cell from the first wedge-shaped optical element, wherein the reflected beam of light passes through the second wedge-shaped optical element, the interior of the optical cell, and the first wedge-shaped optical element; and
performing the multi-pass optical analysis on the reflected beam of light to ascertain a characteristic of the fluid sample.

15. The method of claim 14, further comprising calibrating a third mirror using a stencil that includes a plurality of apertures.

16. The method of claim 15, wherein the first and second mirrors are objective mirrors and the third mirror is a field mirror.

17. The method of claim 16, wherein the calibrating includes aligning the plurality of apertures with points on the field mirror that are reached by beams of light reflected from the objective mirrors.

* * * * *